(12) United States Patent
Kim et al.

(10) Patent No.: US 9,783,066 B2
(45) Date of Patent: Oct. 10, 2017

(54) POWER SUPPLY DEVICE FOR HYBRID CONSTRUCTION MACHINERY, AND METHOD THEREFOR

(71) Applicant: Doosan Infracore Co., Ltd., Incheon (KR)

(72) Inventors: Choon Tack Kim, Seoul (KR); Kyeong Keun Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 85 days.

(21) Appl. No.: 14/655,265

(22) PCT Filed: Dec. 23, 2013

(86) PCT No.: PCT/KR2013/011996
§ 371 (c)(1),
(2) Date: Jun. 24, 2015

(87) PCT Pub. No.: WO2014/104676
PCT Pub. Date: Jul. 3, 2014

(65) Prior Publication Data
US 2015/0352961 A1    Dec. 10, 2015

(30) Foreign Application Priority Data
Dec. 24, 2012 (KR) .................. 10-2012-0152538

(51) Int. Cl.
*H02P 1/00* (2006.01)
*B60L 11/12* (2006.01)
(Continued)

(52) U.S. Cl.
CPC ............... *B60L 11/12* (2013.01); *B60L 1/003* (2013.01); *B60L 3/00* (2013.01); *B60L 11/005* (2013.01);
(Continued)

(58) Field of Classification Search
CPC .. H02J 7/00; H02J 7/14; B60W 10/24; B60W 10/26; H02P 21/34
(Continued)

(56) References Cited

U.S. PATENT DOCUMENTS

2010/0019726 A1* 1/2010 Kumar .................. B60L 3/0046
320/125
2011/0095603 A1* 4/2011 Lee ..................... B60L 11/1803
307/10.1

(Continued)

FOREIGN PATENT DOCUMENTS

| CN | 101415593 A | 4/2009 |
|---|---|---|
| CN | 102611203 A | 7/2012 |

(Continued)

OTHER PUBLICATIONS

International Search Report with English Translation mailed Mar. 27, 2014 for corresponding International Application No. PCT/KR2013/011996, 5 pages.
(Continued)

*Primary Examiner* — Bickey Dhakal
(74) *Attorney, Agent, or Firm* — John D. Veldhuis-Kroeze; Westman, Champlin & Koehler, P.A.

(57) ABSTRACT

The present disclosure relates to a power supply device for hybrid construction machinery, and more particularly, to a power supply device for hybrid construction machinery, which is capable of reducing engine loads and facilitating improvement of engine efficiency by excluding a starting motor used in general hybrid construction machinery and an alternator for charging a battery from hybrid construction machinery, such as a hybrid excavator or vehicle, which commonly uses an engine and an electric motor as a power source and includes an electric energy storage device, and a method for the same.

6 Claims, 13 Drawing Sheets

(51) Int. Cl.
*H02M 5/458* (2006.01)
*B60L 11/18* (2006.01)
*B60W 20/00* (2016.01)
*E02F 9/20* (2006.01)
*B60L 11/00* (2006.01)
*B60W 30/188* (2012.01)
*B60W 20/10* (2016.01)
*B60L 1/00* (2006.01)
*B60L 3/00* (2006.01)
*H02J 7/34* (2006.01)

(52) U.S. Cl.
CPC ....... *B60L 11/1851* (2013.01); *B60L 11/1868* (2013.01); *B60W 20/00* (2013.01); *B60W 20/10* (2013.01); *B60W 30/1886* (2013.01); *E02F 9/2075* (2013.01); *E02F 9/2091* (2013.01); *H02J 7/345* (2013.01); *H02M 5/458* (2013.01); *B60L 2200/40* (2013.01); *B60L 2210/12* (2013.01); *B60L 2210/14* (2013.01); *B60L 2210/30* (2013.01); *B60L 2210/40* (2013.01); *B60L 2240/547* (2013.01); *B60Y 2200/41* (2013.01); *B60Y 2200/412* (2013.01); *B60Y 2400/114* (2013.01); *H02M 5/4585* (2013.01); *Y02T 10/7005* (2013.01); *Y02T 10/7022* (2013.01); *Y02T 10/7066* (2013.01); *Y02T 10/7225* (2013.01); *Y02T 10/7233* (2013.01); *Y02T 10/7241* (2013.01); *Y02T 90/127* (2013.01)

(58) Field of Classification Search
USPC .......................................................... 318/139
See application file for complete search history.

(56) References Cited

U.S. PATENT DOCUMENTS

2012/0016547 A1\* 1/2012 Aridome ................ B60K 6/445
    701/22
2012/0267902 A1\* 10/2012 Kim ...................... B60L 11/005
    290/1 R

FOREIGN PATENT DOCUMENTS

| | | |
|---|---|---|
| CN | 102668313 A | 9/2012 |
| JP | 11-082259 A | 3/1999 |
| KR | 10-2008-0098380 A | 11/2008 |
| KR | 10-2010-0060159 A | 6/2010 |
| KR | 10-2011-0073646 A | 6/2011 |
| KR | 10-1154751 B1 | 6/2012 |

OTHER PUBLICATIONS

Chinese Office Action dated May 30, 2016 for Chinese Application No. 201380067905.4, 6 pages.

\* cited by examiner

[FIG. 1A]
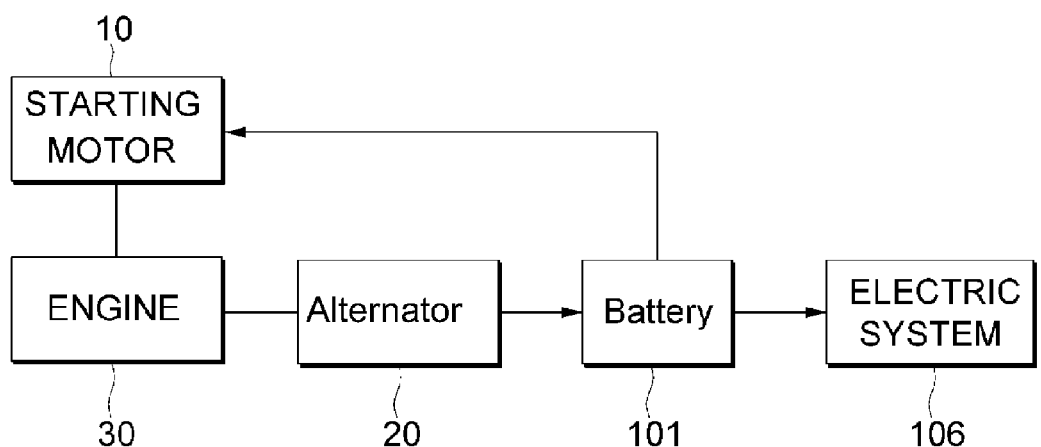

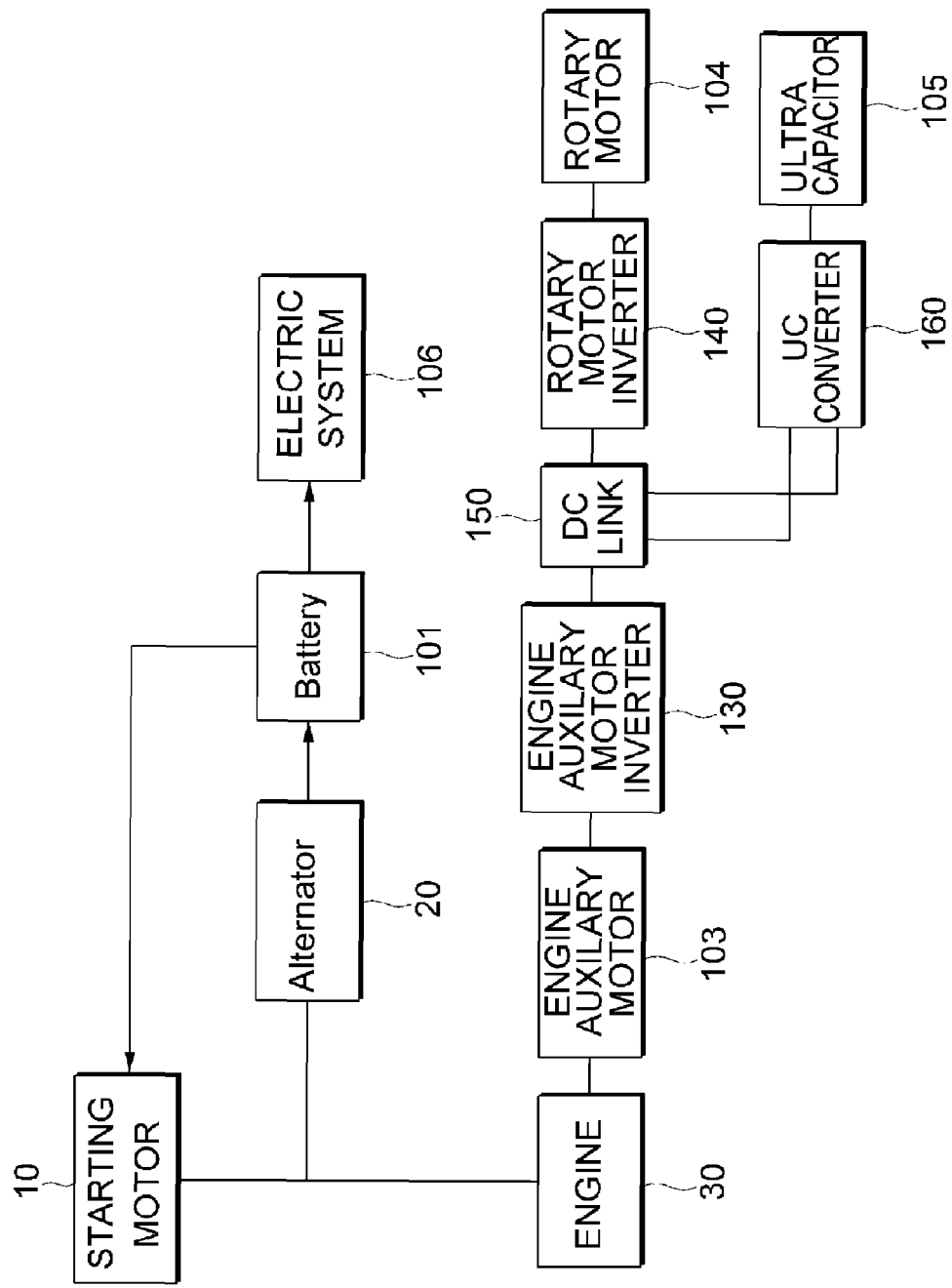
[FIG. 1B]

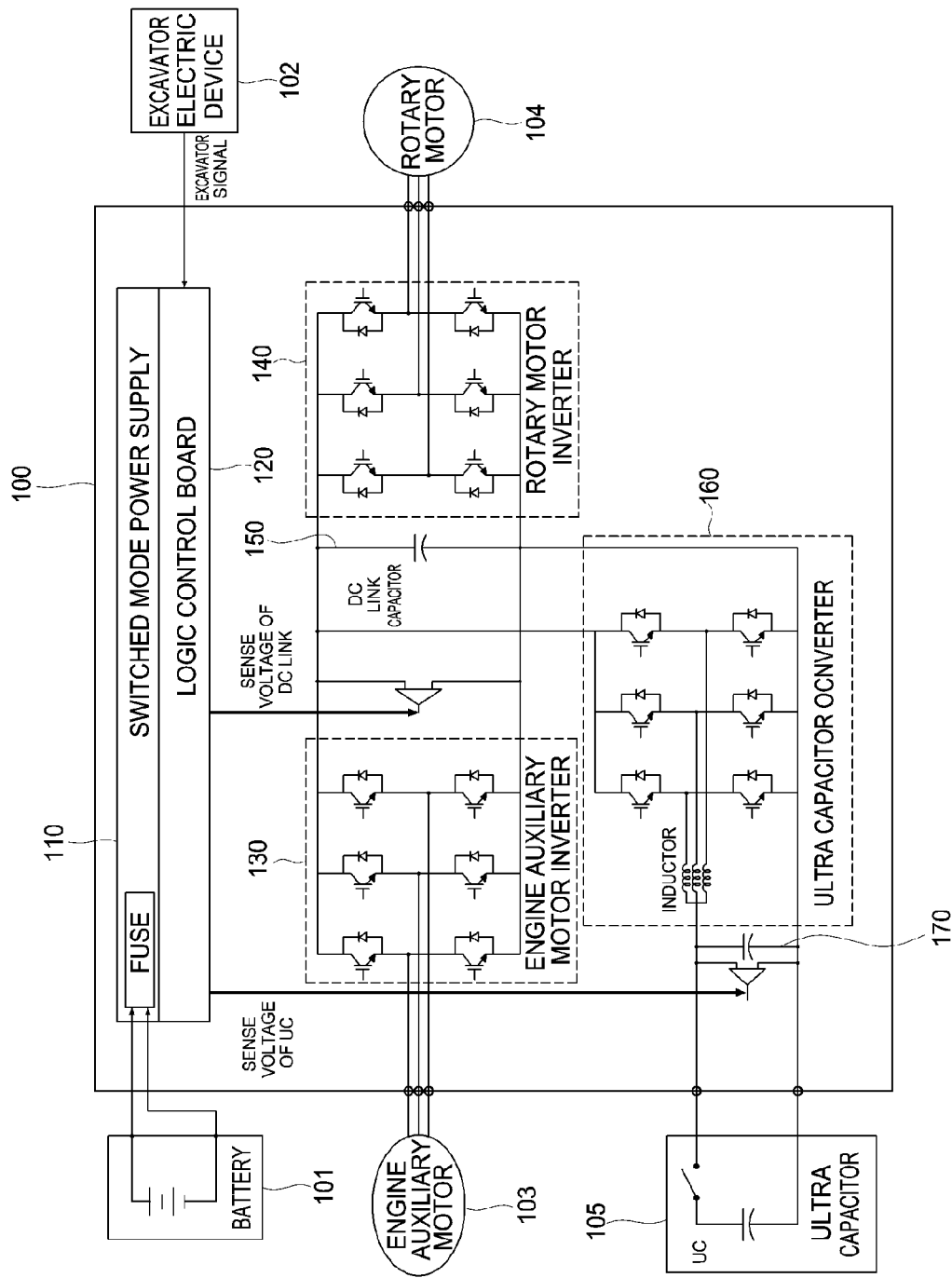
[FIG. 2A]

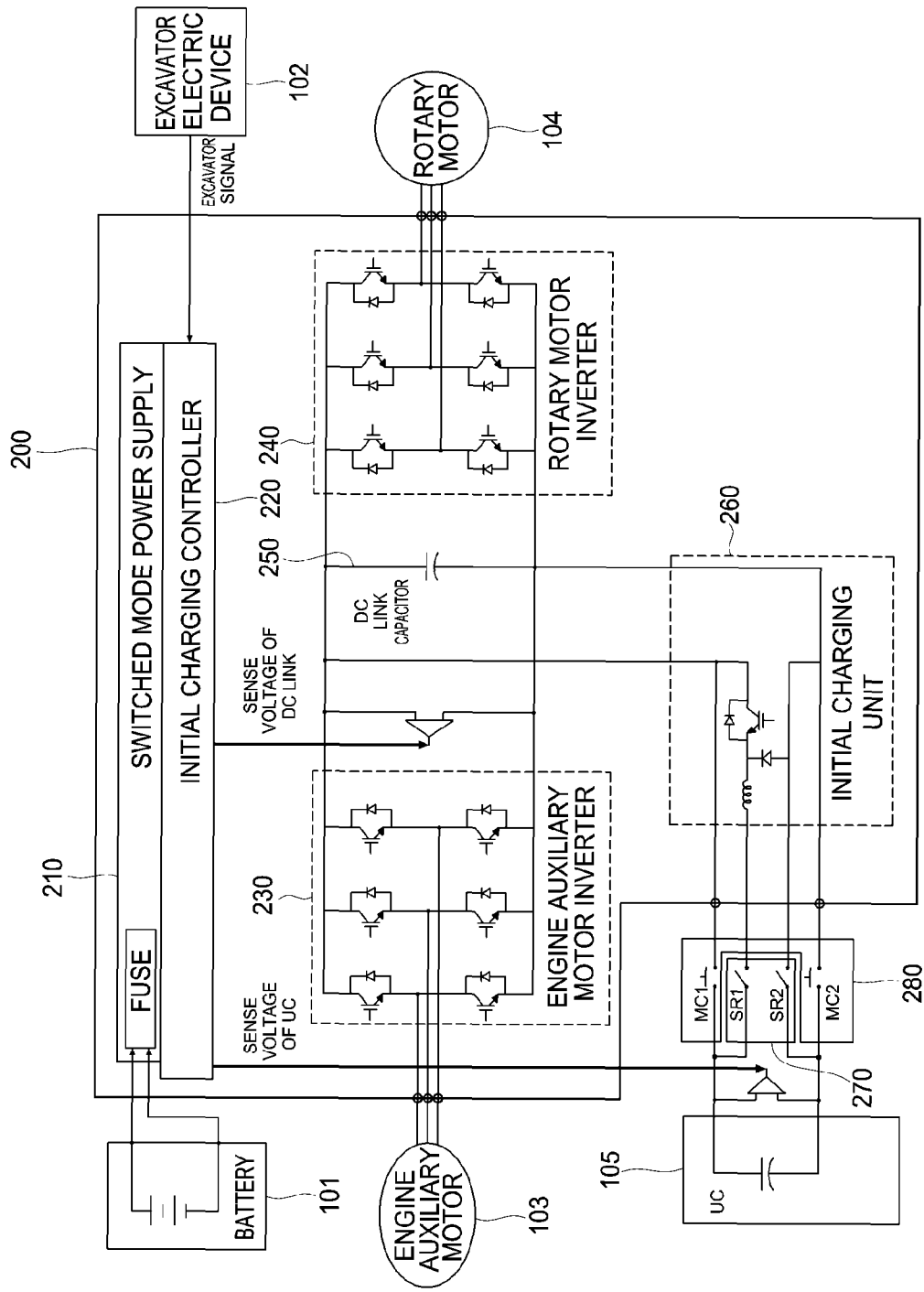
[FIG. 2B]

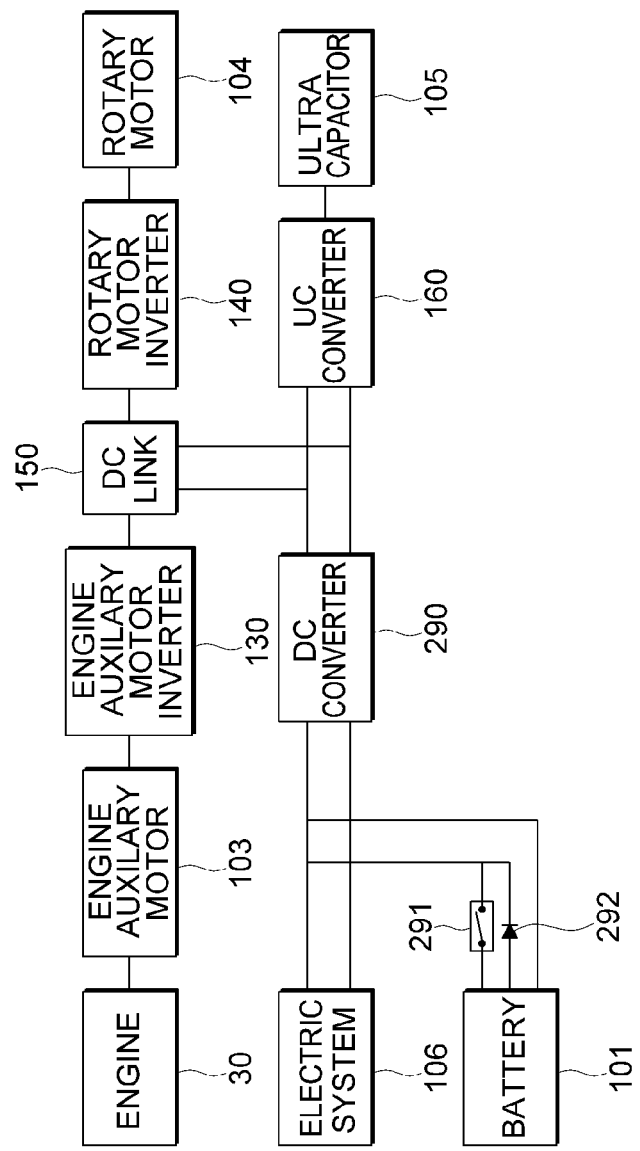
[FIG. 3]

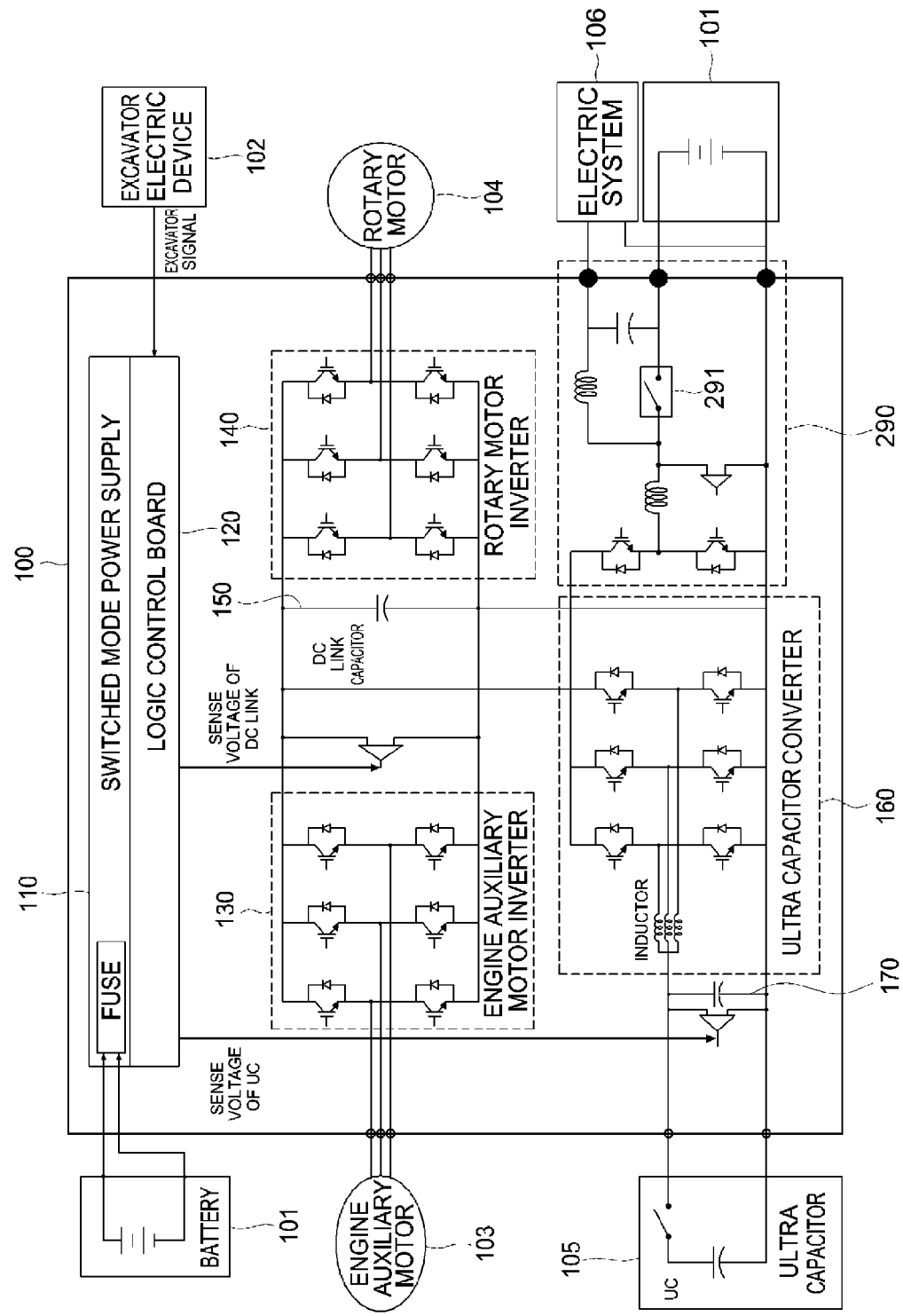
[FIG. 4A]

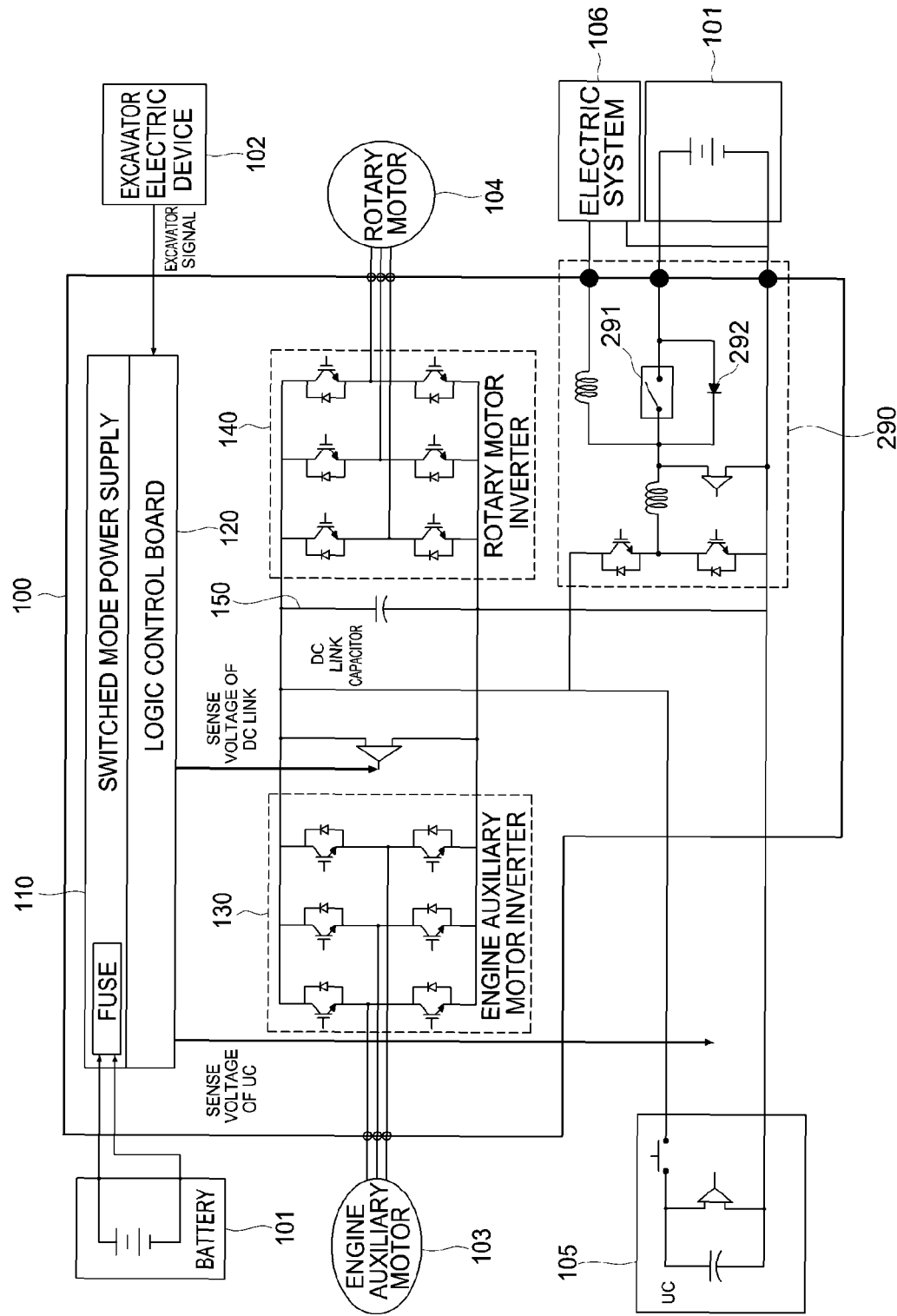
[FIG. 4B]

[FIG. 5]
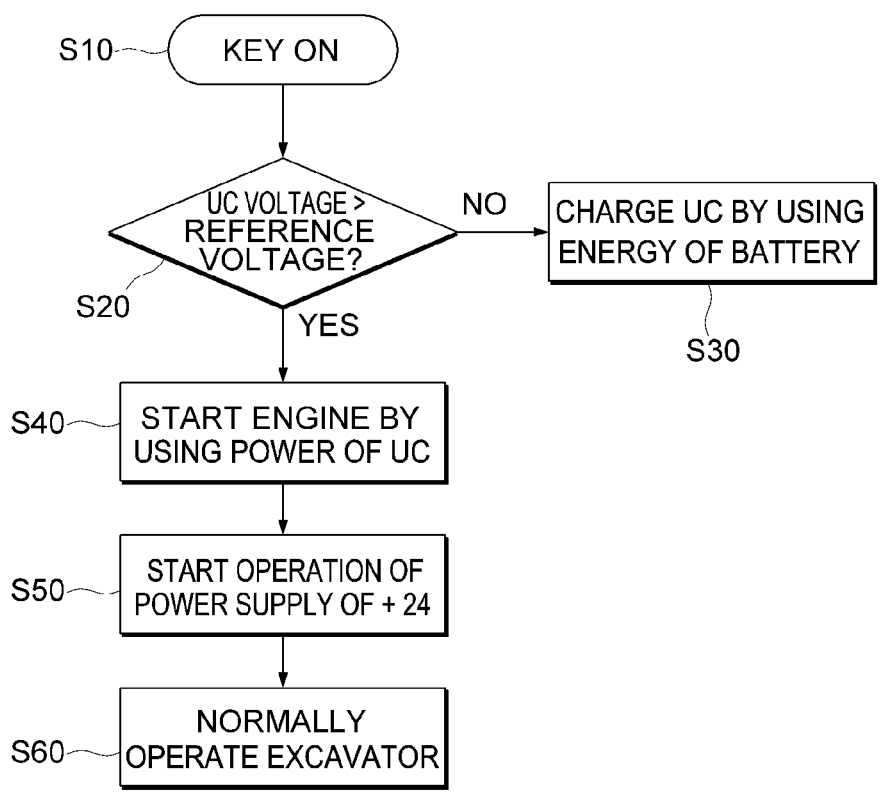

[FIG. 6]
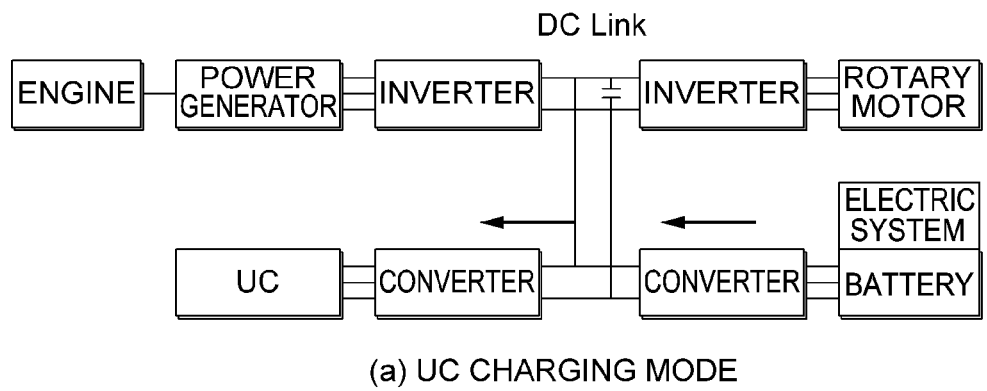
(a) UC CHARGING MODE
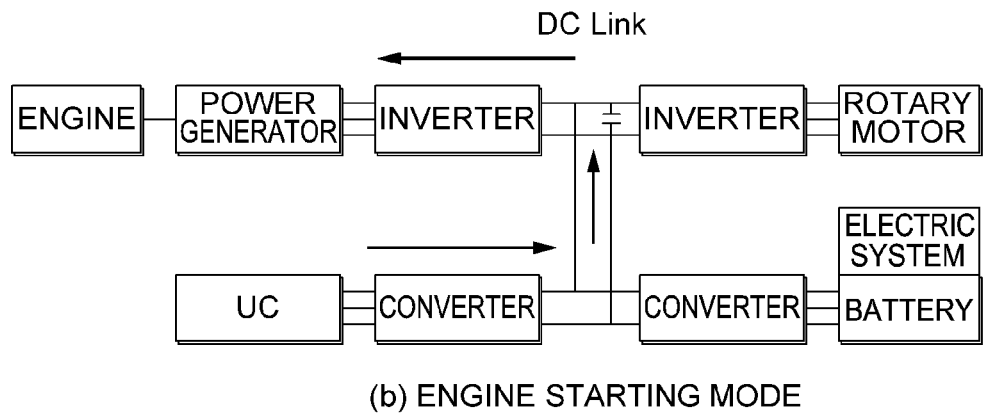
(b) ENGINE STARTING MODE
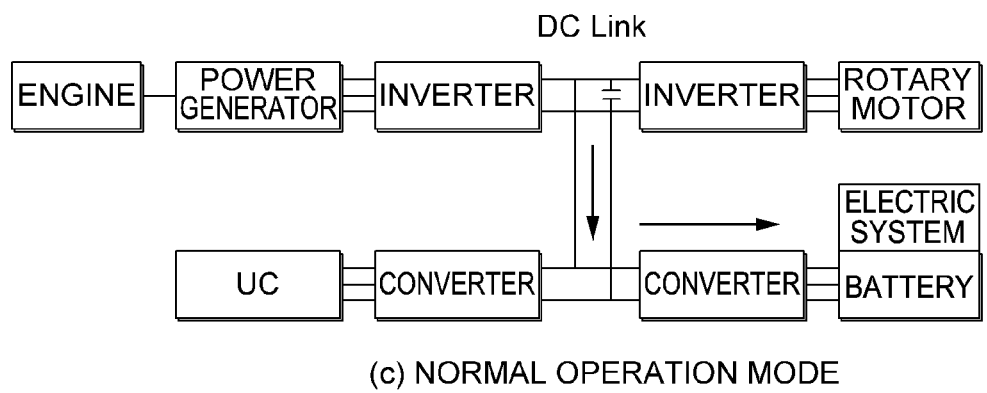
(c) NORMAL OPERATION MODE

[FIG. 7A]
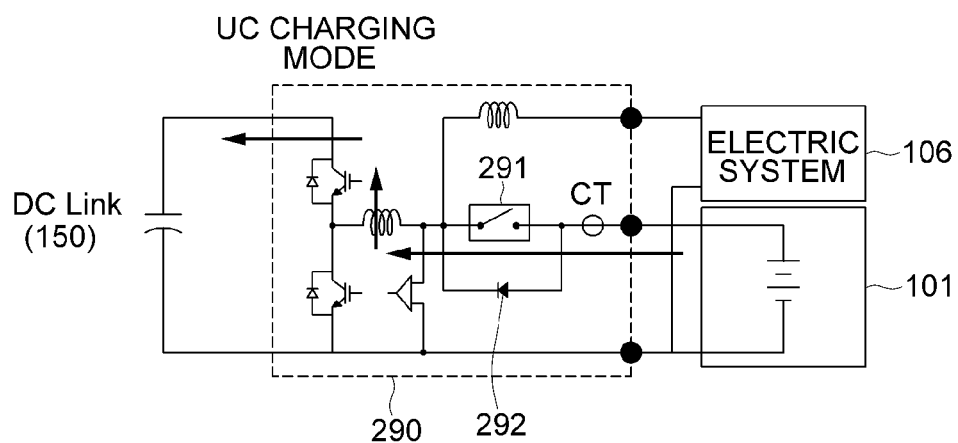

[FIG. 7B]
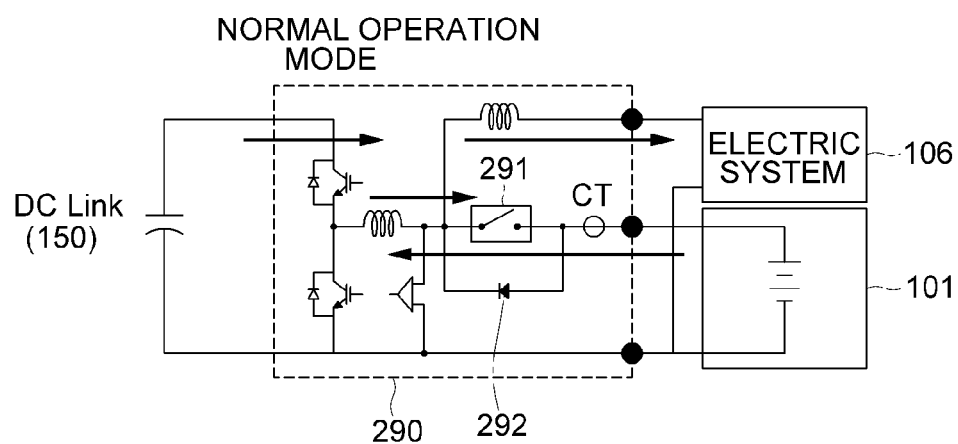

[FIG. 7C]
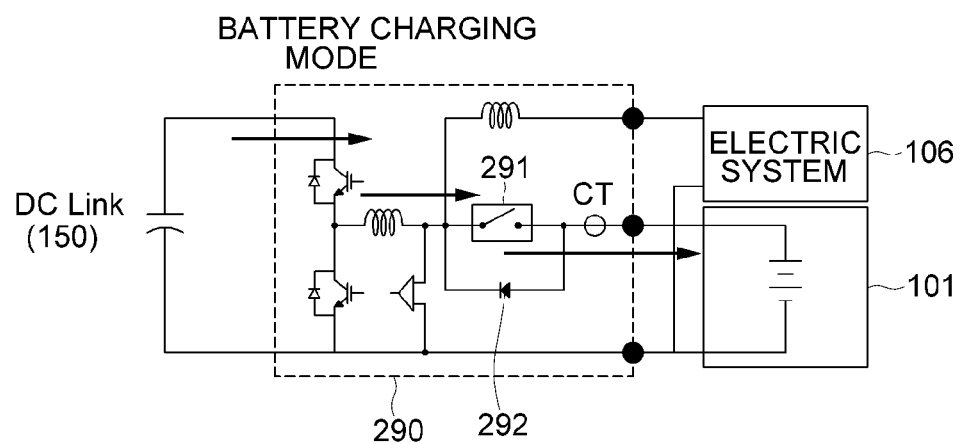

[FIG. 7D]
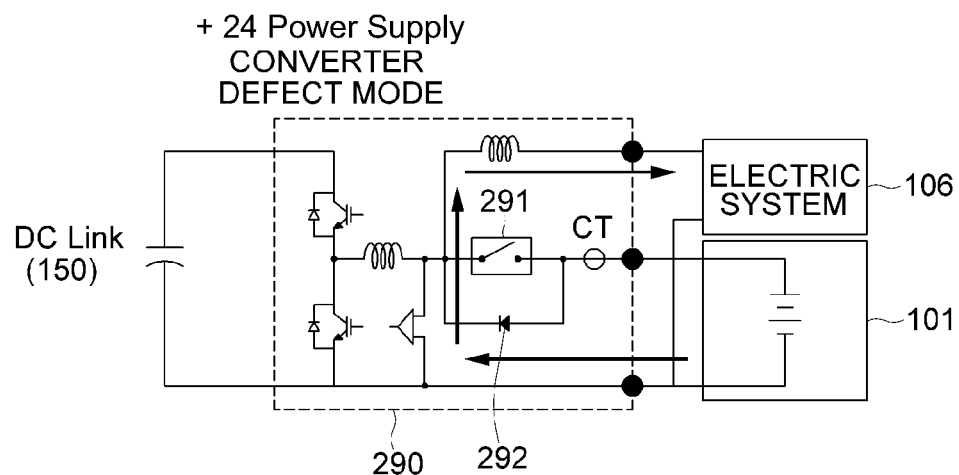

POWER SUPPLY DEVICE FOR HYBRID CONSTRUCTION MACHINERY, AND METHOD THEREFOR

CROSS-REFERENCE TO RELATED APPLICATION

This Application is a Section 371 National Stage Application of International Application No. PCT/KR2013/011996, filed Dec. 23, 2013 and published, not in English, as WO 2014/104676 A1 on Jul. 3, 2014.

FIELD OF THE DISCLOSURE

The present disclosure relates to a power supply device for hybrid construction machinery and a method for the same, and more particularly, to a power supply device for hybrid construction machinery, which is capable of reducing engine loads and facilitating improvement of engine efficiency by excluding a starting motor used in general hybrid construction machinery and an alternator for charging a battery from hybrid construction machinery, such as a hybrid excavator or vehicle, which commonly uses an engine and an electric motor as a power source and includes an electric energy storage device, and a method for the same.

BACKGROUND OF THE DISCLOSURE

Recently, researches on hybrid construction machinery, which improves fuel efficiency by storing surplus power of an engine in a battery, and supplying power from the battery to the engine that does not have sufficient power so as to cope with a rapid increase in oil price, are being actively conducted.

A system, which uses the engine and an electric motor as a common power source as described above, and has an electrical energy storage device, refers to a hybrid system. For example, as the hybrid system, there is a hybrid system for heavy equipment, such as a hybrid vehicle, and an excavator.

In the meantime, a general excavator system performs an operation of driving, and turning or travelling or a boom, an arm, and a bucket, which are final loads, by using an engine as a power source through a medium, that is, hydraulic pressure. By contrast, a hybrid excavator system may improve total efficiency of the excavator system by additionally installing two motors and an electric storage device to a general excavator. Main components added to the hybrid excavator system include a motor, an electric storage device, an inverter, and a converter. Here, the electric storage device includes a battery and an ultra-capacitor (UC).

FIG. 1A illustrates a hydraulic excavator system in the related art and FIG. 1B illustrates a hybrid excavator system in the related art.

The hybrid excavator system of FIG. 1B additionally uses an electric motor as a power source, in addition to an engine, so that the hybrid excavator system of FIG. 1B has the same basic configuration as that of the hybrid excavator system of FIG. 1A except for the addition of the configuration related to the driving of the electric motor and storage of electrical energy, that is, an engine auxiliary motor 103, an engine auxiliary motor inverter 130, a rotary motor 104, a rotary motor inverter 140, a DC link capacitor 150, a UC 105 for storing electric energy, and a UC converter 160 for supplying electric energy to the UC 105.

That is, both systems commonly and essentially requires mounting of a starting motor 10 for starting the engine 30 and an alternator 20 for charging a battery 101 for supplying electric energy to an excavator electric system 106.

In the meantime, the hybrid excavator in the related art includes two methods, that is, a converter method (FIG. 2A) using a UC converter as a means for supplying electric energy to a UC for storing electric energy, and a converter-less method (FIG. 2B) utilizing an initial charging unit instead of a converter.

FIG. 2A illustrates the converter method and FIG. 2B illustrates the converterless methods.

First, a power supply device 100 of the hybrid excavator system according to the converter method of FIG. 2A includes a Switched-Mode Power Supply (SMPS) 110, a logic control board 120, an engine auxiliary motor inverter 130, a rotary motor inverter 140, a DC link capacitor 150, and a UC converter 160 that is DC-DC converter. Here, the SMPS 110, the logic control board 120, the engine auxiliary motor inverter 130, the rotary motor inverter 140, and the UC converter 160 are connected to a control board battery 101, an excavator electric device 102, an engine auxiliary motor 103, a rotary motor 104, and a UC 105, respectively.

The SMPS 110 is connected to the control board battery 101 to supply power to the logic control board 120.

The logic control board 120 performs a function of sensing a voltage of the UC 105 and a voltage of the DC link capacitor 150 and controlling an initial driving logic.

The engine auxiliary motor inverter 130 performs a function of charging the DC link capacitor 150 by the engine auxiliary motor 103. Here, the engine auxiliary motor 103 is directly connected to the engine 30, and rotates at the same rpm as that of the engine 30 when the engine is driven.

When a power connector of the UC 105 is in an on state, the rotary motor inverter 140 performs a function of driving the rotary motor 104 according to a charged voltage. Here, the rotary motor 104 generates power necessary for a rotary operation of an excavator.

The DC link capacitor 150 charges a DC voltage converted by the engine auxiliary motor inverter 130. The DC link capacitor 150 is connected to the UC converter 160.

The UC converter 160 performs a function of charging the UC 105 by using electric energy stored in the DC link capacitor 150. The UC converter 160 is connected between the DC link capacitor 150 and the UC 105. Here, the UC 105 is charged with the voltage converted by the UC 105.

The power converting device 100 including the DC-DC converter including the aforementioned configuration includes an inverter (for example, the engine auxiliary motor inverter 130 and the rotary motor inverter 140) driving a motor and a converter (for example, the UC converter 160) driving the UC. Here, the UC converter 160 accompanies an operation loss during a process of converting a voltage of a DC link to be charged in the UC 105.

However, the UC converter 160 exists, so that there occurs a problem in that an operation loss is generated during the process of converting the voltage of the DC link to be charged in the UC 105, a size of the power converting device 100 is increased, and excessive cost is generated, and in order to solve the problem, a converterless power conversion device, in which the UC converter 160 is omitted, as illustrated in FIG. 2B has been suggested.

Referring to FIG. 2B, the converterless power conversion device has the same configuration as that of the converter method of FIG. 2A, but is different from the converter method of FIG. 2A in that the UC converter 160 is omitted, but an initial charging unit 260 is provided between a DC link capacitor 250 and a UC 105 to charge the UC 105. Further, a small capacity relay (SR1 and SR2) 270 for initial charging and a large capacity connector (MC1 and MC2) 280 for conducting a high current are provided in order to make a voltage of the UC 105 correspond to a voltage of the DC link capacitor 250, so that the UC 105 makes a voltage of the UC 105 correspond to a voltage of the DC link capacitor 250 according to the operations of the small capacity relay (SR1 and SR2) 270 for initial charging and the large capacity connector (MC1 and MC2) 280 for conducting a high current controlled by an initial charging controller 220. The converterless method solves the problem (cost, size, and the like) caused by the existence of the converter.

However, both the converter method of FIG. 2A and the converterless method of FIG. 2B commonly have a problem in that it is necessary to mount a starting motor for starting an engine and an alternator for charging a battery (see FIG. 1B). That is, there are problems in that the starting motor is high-priced, charging/discharging of the battery is repeated through the alternator to cause energy loss, a high current is output to the battery during starting, so that a lifespan of the battery is decreased, and engine efficiency deteriorates due to existence of the alternator, so that it is necessary to solve the problems.

The discussion above is merely provided for general background information and is not intended to be used as an aid in determining the scope of the claimed subject matter.

SUMMARY

The summary and the abstract are provided to introduce a selection of concepts in a simplified form that are further described below in the Detailed Description. The summary and the abstract are not intended to identify key features or essential features of the claimed subject matter.

An embodiment of the present disclosure is conceived to solve the aforementioned problems, and an object of an embodiment of the present disclosure provides a power supply device for hybrid construction machinery capable of efficiently supplying power while a starting motor for starting an engine and an alternator for charging a battery are removed in hybrid construction machinery, and a method for the same.

In order to achieve the above object, a power supply device for hybrid construction machinery and a method for the same according to the present disclosure facilitate cost reduction and improve engine operation efficiency by removing a starting motor for starting an engine and an alternator for charging a battery, and facilitate an energy reduction effect by enabling electric energy to be supplied to an electric system without a process of charging/discharging the battery.

That is, the starting motor, which has been used to start the engine is removed, and instead, the engine is started by using an engine auxiliary motor. Further, a power conversion device (DC/DC converter) directly connected to a first capacitor means (DC link capacitor) storing energy generated by the engine auxiliary motor is provided, so that the battery is charged without the alternator and the power conversion device (DC/DC converter), instead of the battery, supplies energy to the electric system.

More particularly, an exemplary embodiment of the present disclosure provides a power supply device for hybrid construction machinery including an engine, a load motor, a battery, and an electric system, including: an engine auxiliary motor configured to start the engine when the hybrid construction machinery starts; a first capacitor means positioned between a first inverter connected to the engine auxiliary motor and a second inverter connected to the load motor, and accumulate generated electric energy; a second capacitor means configured to supply electric energy to the engine auxiliary motor through the first capacitor means when the hybrid construction machinery starts; a power conversion means positioned between a converter connected to the second capacitor means and the battery, and connected to the first capacitor means and the electric system to convert power; and a controller configured to charge the second capacitor means by using electric energy of the battery when a voltage of the second capacitor means is smaller than a reference voltage necessary for initially starting the engine when the hybrid construction machinery starts, and supply the electric energy accumulated in the first capacitor means to the electric system when the hybrid construction machinery is normally operated.

Another exemplary embodiment of the present disclosure provides a power supply method for hybrid construction machinery, including: checking a voltage of a second capacitor means when the hybrid construction machinery starts; accumulating electric energy in the second capacitor means by using electric energy of a battery when a voltage of the second capacitor means is smaller than a reference voltage necessary for initially starting the engine when the hybrid construction machinery starts; supplying electric energy to an engine auxiliary motor from the second capacitor means and starting an engine when the voltage of the second capacitor means is equal to or larger than a reference voltage necessary for initially starting the engine; and performing a normal operation of supplying electric energy accumulated in a first capacitor means to an electric system when the hybrid construction machinery normally operates.

The power supply device for hybrid construction machinery and the method for the same according to the present disclosure facilitate cost reduction and improve engine operation efficiency by removing a starting motor for starting an engine and an alternator for charging a battery, and facilitate an energy reduction effect by enabling electric energy to be supplied to an electric system without a process of charging/discharging the battery.

That is, the starting motor, which has been used for start the engine is removed, and instead, the engine is started by using an engine auxiliary motor. Further, a power conversion device (DC/DC converter) directly connected to a first capacitor means (DC link capacitor) storing energy generated by the engine auxiliary motor is provided, so that the battery is charged without the alternator and the power conversion device (DC/DC converter), instead of the battery, supplies energy to the electric system.

DESCRIPTION OF THE DRAWINGS

FIG. 1A is a configuration diagram of a hydraulic excavator system in the related art.

FIG. 1B is a configuration diagram of a hybrid excavator system in the related art.

FIG. 2A is a detailed diagram of a hybrid excavator system according to a converter method in the related art.

FIG. 2B is a detailed diagram of a hybrid excavator system according to a converterless method in the related art.

FIG. 3 is a conceptual diagram of a power supply device for hybrid construction machinery according to the present disclosure.

FIG. 4A is a detailed diagram of a hybrid excavator system according to a converter method according to the present disclosure.

FIG. 4B is a detailed diagram of a hybrid excavator system according to a converterless method according to the present disclosure.

FIG. 5 is a flowchart for describing a power supply method by the power supply device for hybrid construction machinery according to the present disclosure.

FIGS. 6 and 7 are diagrams for describing an operation state for each operation mode of the device according to the present disclosure.

Description of Main Reference Numerals of the Drawings

| | |
|---|---|
| 10: Starting motor | 30: Engine |
| 20: Alternator | 101: Battery |
| 106: Electric system | 103: Engine auxiliary motor |
| 280: Controller | 130: Engine auxiliary motor inverter |
| 150: DC link | 140: Rotary motor inverter |
| 104: Rotary motor | 160: UC converter |
| 105: Ultra capacitor | 290: DC/DC converter |
| 291: Switching means | 292: Diode |

DETAILED DESCRIPTION

Hereinafter, an exemplary embodiment of the present disclosure will be described in detail with reference to the accompanying drawing. A configuration of the present disclosure and an operation and an effect according to the configuration of the present disclosure will be clearly understood by the detailed description below. In the following description, the same elements will be designated by the same reference numerals although the elements are illustrated in different drawings, and a detailed explanation of known related constitutions may be omitted so as to avoid unnecessarily obscuring the subject matter of the present disclosure.

FIG. 3 is a conceptual diagram of a power supply device for hybrid construction machinery according to the present disclosure. The power supply device of FIG. 3 is different from the power supply device for hybrid construction machinery in the related art of FIG. 1B in that the existing starting motor 10 and alternator 20 are removed. That is, the starting motor 10 used for starting an engine is removed, and instead, the engine starts by using an engine auxiliary motor 103.

Further, a first charge storing means (DC link capacitor) 150 storing energy generated by the engine auxiliary motor 103 is directly connected to a power conversion means (DC/DC converter) 290. The power conversion means (DC/DC converter) 290 performs charging of the battery 101 instead of the alternator, and supplies energy to an electric system 106, instead of the battery 101.

Further, the switching means 291 makes the battery 101 and a second capacitor means 105 be electrically conducted only when a voltage of the second capacitor means (UC) 105 is smaller than a reference voltage necessary for initially starting the engine when the hybrid construction machinery starts, so that the power supply device for hybrid construction machinery charges the second capacitor means 105 by the battery 101.

Further, the power supply device for hybrid construction machinery may also include a current control means (diode) 292, and when the power conversion means (DC/DC converter) 290 has a defect, the current control means 292 makes the battery 101 instead of the power conversion means (DC/DC converter) 290 supply electric energy to the electric system 106.

Hereinafter, an exemplary embodiment of the present disclosure will be described in detail with reference to FIGS. 4A and 4B. Detailed descriptions of the same contents as those of the related art are omitted, and different matters will be mainly described.

FIG. 4A illustrates an exemplary embodiment of the present disclosure for a converter method, and FIG. 4B illustrates an exemplary embodiment of the present disclosure for a converterless method.

The converter method of FIG. 4A is different from the converter method in the related art illustrated in FIG. 2A in that the existing starting motor 10 and alternator 20 are omitted.

That is, the starting motor 10 used for starting the engine is removed, and instead, the engine starts by using the engine auxiliary motor 103.

Further, the converter method of FIG. 4A is different from an existing converter method in that the power conversion means (DC/DC converter) 290 is provided. The power conversion means (DC/DC converter) 290 is directly connected to the first capacitor means (DC link capacitor) 150 storing energy generated by the engine auxiliary motor 103. The power conversion means (DC/DC converter) 290 performs charging of the battery 101 instead of the alternator, and supplies energy to the electric system 106, instead of the battery 101.

Further, the switching means 291 makes the battery 101 and the second capacitor means (UC) 105 be electrically conducted only when a voltage of the second capacitor means (UC) 105 is smaller than a reference voltage necessary for initially starting the engine when the hybrid construction machinery starts, so that the second capacitor means (UC) 105 is charged by the battery 101.

In the meantime, when the voltage of the second capacitor means (UC) 105 is equal to or larger than the reference voltage necessary for initially starting the engine, the switching means 291 is off, and instead, the second capacitor means 105 supplies electric energy to the engine auxiliary motor 103 to start the engine.

The aforementioned control is performed by a controller 280. That is, when the voltage of the second capacitor means (UC) 105 is smaller than the reference voltage necessary for initially starting the engine when the hybrid construction machinery starts, the controller 280 controls the battery 101 to supply charging energy to the second capacitor means 105, and when the voltage of the second capacitor means 105 is equal to or larger than the reference voltage necessary for initially starting the engine, the controller controls the second capacitor means 105 to supply electric energy to the engine auxiliary motor 103 to start the engine 30.

The converterless method of FIG. 4B is different from the converterless method in the related art illustrated in FIG. 2B in that the existing starting motor 10 and alternator 20 are omitted.

The power conversion means (DC/DC converter) 290 is directly connected to the first capacitor means (DC link capacitor) 150 storing energy generated by the engine auxiliary motor 103. The power conversion means (DC/DC converter) 290 performs charging of the battery 101 instead of the alternator, and supplies energy to the electric system 106, instead of the battery 101, which is similar to the converter method of FIG. 4A.

Further, the switching means 291 makes the battery 101 and the second capacitor means (UC) 105 be electrically conducted only when a voltage of the second capacitor means (UC) 105 is smaller than a reference voltage necessary for initially starting the engine when the hybrid construction machinery starts, so that the second capacitor means (UC) 105 is charged by the battery 101.

In the meantime, in the converterless method of FIG. 4B, a current control means (diode) 292 may be further provided, differently from the converter method of FIG. 4A. When the power conversion means (DC/DC converter) 290 has a defect, the current control means 292 makes the battery 101 supply electric energy to the electric system 106, instead of the power conversion means (DC/DC converter) 290.

The current control means 292 makes a voltage of the UC 105 correspond to a voltage of the DC link capacitor 250 according to an operation of a large capacitor contactor (MC) 280-1 for high current conduction.

The aforementioned control is performed by a controller 280. That is, when the voltage of the second capacitor means (UC) 105 is smaller than the reference voltage necessary for initially starting the engine when the hybrid construction machinery starts, the controller 280 controls the battery 101 to supply charging energy to the second capacitor means 105, and when the voltage of the second capacitor means 105 is equal to or larger than the reference voltage necessary for initially starting the engine, the controller controls the second capacitor means 105 to supply electric energy to the engine auxiliary motor 103 to start the engine 30.

FIG. 5 is a flowchart for describing a power supply method by the power supply device for hybrid construction machinery according to the present disclosure.

When a driver initially turns a key to an on-position (S10), the controller 280 checks a charging state of the second capacitor means (UC) 105 (S20).

When a voltage of the UC 105 is equal to or larger than a reference voltage that is a minimum voltage necessary for initially starting the engine as a result of the check in operation S20, and energy of the UC 105 is sufficient to start the engine 30, the controller 280 immediately enters to an engine starting mode and starts the engine 30 by using power of the UC 105 (S40).

By contrast, when the voltage of the UC 105 is smaller than the reference voltage that is a minimum voltage necessary for initially starting the engine as the result of the check in operation S20, the controller 280 charges the UC 105 by using energy of the battery 101 (S30), and then performs operation S20 of checking the charging state of the UC 105 again. Then, when the voltage of the UC 105 reaches the reference voltage, the controller 280 drives in the engine starting mode (S40).

In the meantime, when the engine 30 is started, the controller 280 supplies energy stored in the DC link capacitor 150 and 250 to the electric system 106 by using the DC/DC converter 290 as necessary power having of +24 V (S50), and normally operates an excavator (S60).

FIGS. 6 and 7 are diagrams for describing an operation state for each operation mode of the device according to the present disclosure. As described above, the power supply device according to the present disclosure includes a total of five operation modes including a UC charging mode (FIGS. 6A and 7A), an engine starting mode (FIG. 6B), a normal operation mode (FIGS. 6C and 7B), a battery charging mode (FIG. 7C), and a defect mode (FIG. 7D).

The UC charging mode will be described with reference to FIGS. 6A and 7A.

FIGS. 6A and 7A illustrate the UC charging mode, and when the UC is discharged during an initial start, so that the voltage of the UC is smaller than the reference voltage that is the minimum voltage necessary for starting an engine, the switching means 291 is on, and the UC is charged via the UC converter through the DC/DC converter 290 and the DC link 150 by using energy of the battery 101.

The engine starting mode will be described with reference to FIG. 6B.

FIG. 6B illustrates the engine starting mode, and when the voltage of the UC is equal to or larger than the reference voltage, power is supplied to the inverter and the power generator through the UC converter and the DC link by using energy of the UC in order to start the engine, and the engine 30 is rotated through the supplied power to start the engine.

The normal operation mode will be described with reference to FIGS. 6C and 7B.

FIGS. 6C and 7B illustrate the normal operation mode after the engine starts. In the normal operation mode, the switching means 291 is off, and energy of the DC link 150 is converted into the necessary voltage (+24 V) via the DC/DC converter 290 and then necessary power is generated and supplied to the electric system 106.

The battery charging mode will be described with reference to FIG. 7C.

FIG. 7C illustrates the battery charging mode, and the switching means 291 is turned on, energy stored in the DC link capacitor 150 is converted into necessary voltage (+24 V) via the DC/DC converter 290, and then the battery 101 is charged with the necessary voltage (+24 V).

The defect mode will be described with reference to FIG. 7D.

FIG. 7D illustrates a defect mode, and a case where the DC/DC converter 290 has a defect. In this case, energy of the battery 101 is automatically supplied to the electric system 106 through the current control means 292, instead of the DC/DC converter 290.

From the foregoing, it will be appreciated that the exemplary embodiments of the present disclosure have been described herein for purposes of illustration, and that various modifications may be made by those skilled in the art without departing from the scope and spirit of the present disclosure. The exemplary embodiments disclosed in the specification of the present disclosure do not limit the present disclosure. The scope of the present disclosure shall be construed on the basis of the following claims in such a manner that all of the technical ideas included within the scope equivalent to the claims belong to the present disclosure.

The invention claimed is:

1. A power supply device for hybrid construction machinery having a first capacitor means and a second capacitor means including an engine, a load motor, a battery, and an electric system, comprising:

an engine auxiliary motor configured to start the engine when the hybrid construction machinery starts and to generate electrical energy;

a first capacitor means positioned between a first inverter configured to be connected to the engine auxiliary motor and a second inverter configured to be connected to the load motor, and accumulate electric energy generated by the engine auxiliary motor;

a second capacitor means configured to supply electric energy to the engine auxiliary motor through the first capacitor means when the hybrid construction machinery starts;

a power conversion means positioned between a converter connected to the second capacitor means and the battery, and connected to the first capacitor means and the electric system to convert power; and a controller configured to charge the second capacitor means by using electric energy of the battery when a voltage of the second capacitor means is smaller than a reference voltage necessary for initially starting the engine when the hybrid construction machinery starts, and supply the electric energy accumulated in the first capacitor means to the electric system when the hybrid construction machinery is normally operated.

2. The power supply device of claim 1, wherein when the voltage of the second capacitor means is smaller than the reference voltage necessary for initially starting the engine when the hybrid construction machinery starts, the controller controls the power conversion means, so that charging energy is supplied to the second capacitor means from the battery, and when the voltage of the second capacitor means is equal to or larger than the reference voltage necessary for initially starting the engine, the controller controls the second capacitor means to supply electric energy to the engine auxiliary motor to start the engine.

3. The power supply device of claim 1, further comprising:
a switching means configured to make the second capacitor means be charged by the battery by electrically conducting the battery and the second capacitor means only when the voltage of the second capacitor means is smaller than the reference voltage necessary for initially starting the engine when the hybrid construction machinery starts.

4. The power supply device of claim 1, further comprising:
a current control means configured to supply electric energy to the electric system from the battery, instead of the power conversion means, when the power conversion means has a defect.

5. A power supply method for hybrid construction machinery, comprising:
checking a voltage of a the second capacitor means when the hybrid construction machinery starts;
accumulating electric energy in the the second capacitor means by using electric energy of a battery when a voltage of the the second capacitor means is smaller than a reference voltage necessary for initially starting an engine when the hybrid construction machinery starts;
supplying electric energy to an engine auxiliary motor from the second capacitor means and starting the engine when the voltage of the the second capacitor means is equal to or larger than the reference voltage necessary for initially starting the engine; and
performing a normal operation of supplying electric energy accumulated in a the second capacitor means to an electric system when the hybrid construction machinery normally operates.

6. The power supply method of claim 5, further comprising:
when a power conversion means has a defect, supplying electric energy to the electric system from the battery, instead of the power conversion means to respond to the defect.

* * * * *

UNITED STATES PATENT AND TRADEMARK OFFICE
CERTIFICATE OF CORRECTION

PATENT NO. : 9,783,066 B2
APPLICATION NO. : 14/655265
DATED : October 10, 2017
INVENTOR(S) : Choon Tack Kim and Kyeong Keun Kim It is certified that error appears in the above-identified patent and that said Letters Patent is hereby corrected as shown below:

In the Claims

Claim 5:
Column 10, Line 7, delete "a the second" and insert --the second--
Column 10, Line 9, delete "the the second" and insert --the second--
Column 10, Line 11, delete "the the second" and insert --the second--
Column 10, Line 17, delete "the the second" and insert --the second--
Column 10, Line 21, delete "a the second" and insert --the second--

Signed and Sealed this
Twentieth Day of November, 2018

Andrei Iancu
*Director of the United States Patent and Trademark Office*